(12) United States Patent
Wierman

(10) Patent No.: US 9,570,101 B2
(45) Date of Patent: Feb. 14, 2017

(54) MAGNETIC ADHESION LAYER AND METHOD OF FORMING SAME

(71) Applicant: SEAGATE TECHNOLOGY LLC, Cupertino, CA (US)

(72) Inventor: Kurt W. Wierman, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/011,877

(22) Filed: Aug. 28, 2013

(65) Prior Publication Data

US 2015/0063086 A1 Mar. 5, 2015

(51) Int. Cl.
| | | |
|---|---|---|
| *G11B 5/60* | (2006.01) | |
| *G11B 5/40* | (2006.01) | |
| *G11B 5/65* | (2006.01) | |
| *G11B 5/72* | (2006.01) | |
| *G11B 5/31* | (2006.01) | |
| *G11B 5/00* | (2006.01) | |

(52) U.S. Cl.
CPC .............. *G11B 5/40* (2013.01); *G11B 5/3106* (2013.01); *G11B 5/3146* (2013.01); *G11B 5/6082* (2013.01); *G11B 5/65* (2013.01); *G11B 5/72* (2013.01); *G11B 2005/0021* (2013.01)

(58) Field of Classification Search
CPC .................................. G11B 5/60; G11B 5/187
USPC ............. 360/235.7, 235.8, 236.3, 236.5, 122
See application file for complete search history.

(56) References Cited

U.S. PATENT DOCUMENTS

| | | | | |
|---|---|---|---|---|
| 5,808,973 | A * | 9/1998 | Tanaka | 369/14 |
| 6,144,529 | A * | 11/2000 | Wada | G11B 5/6005 360/235.6 |
| 6,353,492 | B2 * | 3/2002 | McClelland | 359/224.1 |
| 6,778,358 | B1 * | 8/2004 | Jiang et al. | 360/125.5 |
| 6,958,885 | B1 * | 10/2005 | Chen | G11B 5/3106 29/603.07 |
| 7,057,859 | B2 * | 6/2006 | Kagami et al. | 360/317 |
| 7,137,190 | B2 * | 11/2006 | Hsiao et al. | 29/603.08 |
| 7,177,117 | B1 * | 2/2007 | Jiang et al. | 360/125.12 |
| 7,207,100 | B2 * | 4/2007 | Kagami et al. | 29/603.16 |
| 7,308,751 | B2 * | 12/2007 | Kagami et al. | 29/603.07 |
| 7,312,961 | B2 * | 12/2007 | Kagami et al. | 360/324.2 |
| 7,327,535 | B2 * | 2/2008 | Feng et al. | 360/235.4 |
| 7,495,865 | B2 | 2/2009 | Chen | |
| 7,522,377 | B1 * | 4/2009 | Jiang et al. | 360/125.12 |
| 8,035,929 | B2 * | 10/2011 | Kawakita et al. | 360/315 |
| 8,254,212 | B2 | 8/2012 | Snyder | |
| 8,351,305 | B2 | 1/2013 | Zhou | |

(Continued)

FOREIGN PATENT DOCUMENTS

JP 2001156357 A * 6/2001

*Primary Examiner* — Allen T Cao
(74) *Attorney, Agent, or Firm* — Mueting, Raasch & Gebhardt, P.A.

(57) ABSTRACT

A device having an air bearing surface and a method of forming the device are disclosed. The device can include a writer portion including a surface at the air bearing surface of the device, a magnetic adhesion layer disposed proximate at least a portion of the surface of the writer portion, and an overcoat disposed proximate at least a portion of the magnetic adhesion layer such that the magnetic adhesion layer is between the at least a portion of the surface of the writer portion and the overcoat.

18 Claims, 3 Drawing Sheets

(56) References Cited

U.S. PATENT DOCUMENTS

| | | | |
|---|---|---|---|
| 2006/0035087 A1* | 2/2006 | Yadav | C03C 27/10 |
| | | | 428/411.1 |
| 2007/0297101 A1* | 12/2007 | Inomata | B82Y 10/00 |
| | | | 360/324.11 |
| 2010/0310982 A1* | 12/2010 | Ohtani | G03G 9/1136 |
| | | | 430/111.32 |
| 2013/0033779 A1 | 2/2013 | Kodama | |
| 2013/0128385 A1 | 5/2013 | Karr | |

* cited by examiner

MAGNETIC ADHESION LAYER AND METHOD OF FORMING SAME

BACKGROUND

Disc drive systems can be used for storage of digital information that can be recorded on concentric tracks of a magnetic disc medium. Several discs are rotatably mounted on a spindle, and the information, which can be stored in the form of magnetic transitions within the discs using a writer, is accessed using a reader. The reader and/or writer is carried by a slider that is located on an actuator arm that moves radially over the surface of the disc. The slider and transducer can be collectively referred to as a magnetic head.

The discs can be rotated at high speeds during operation. As the discs are spun, the slider and the reader and/or writer glide above the surface of the disc on a small cushion of air. Upon reaching a predetermined high rotational speed, the head floats in air at a predetermined distance from the surface of the disc where it is maintained during reading and recording operations. To maximize this high areal recording density, the flying height (i.e., the distance between the head and the surface of the disc as the head floats above the surface) can be minimized.

One or both of the air bearing surfaces of the head and the disc can be coated with a diamond like carbon (DLC) protective overcoat and/or a lubricant layer. The function of the DLC overcoat is to protect underlying metals and alloys from wear and corrosion during the manufacturing process and throughout the lifetime of the disc drive system. As applied to the head, the DLC overcoat can include a DLC overcoat and an adhesion layer. DLC overcoat thickness for the head can range from about 10 to 20 angstroms, while typical values of DLC overcoats for magnetic media can be in excess of 20 Angstroms. DLC overcoat thicknesses is one of the biggest contributors to head media separation (HMS) distance. The HMS distance is measured from the magnetic surface of the head to the magnetic surface of the media. The HMS distance in turn affects the data reading and writing efficiency of the transducer.

SUMMARY

In one aspect, the present disclosure provides a device having an air bearing surface. The device includes a writer portion including a surface at the air bearing surface of the device, a magnetic adhesion layer disposed proximate at least a portion of the surface of the writer portion, and an overcoat disposed proximate at least a portion of the magnetic adhesion layer such that the magnetic adhesion layer is between the at least a portion of the surface of the writer portion and the overcoat.

In another aspect, the present disclosure provides a method that includes forming a device having an air bearing surface, where the device includes a writer portion including a surface at the air bearing surface of the device. The method further includes forming a magnetic adhesion layer on at least a portion of the surface of the writer portion, and forming an overcoat on at least a portion of the magnetic adhesion layer such that the magnetic adhesion layer is between the at least a portion of the surface of the writer portion and the overcoat.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
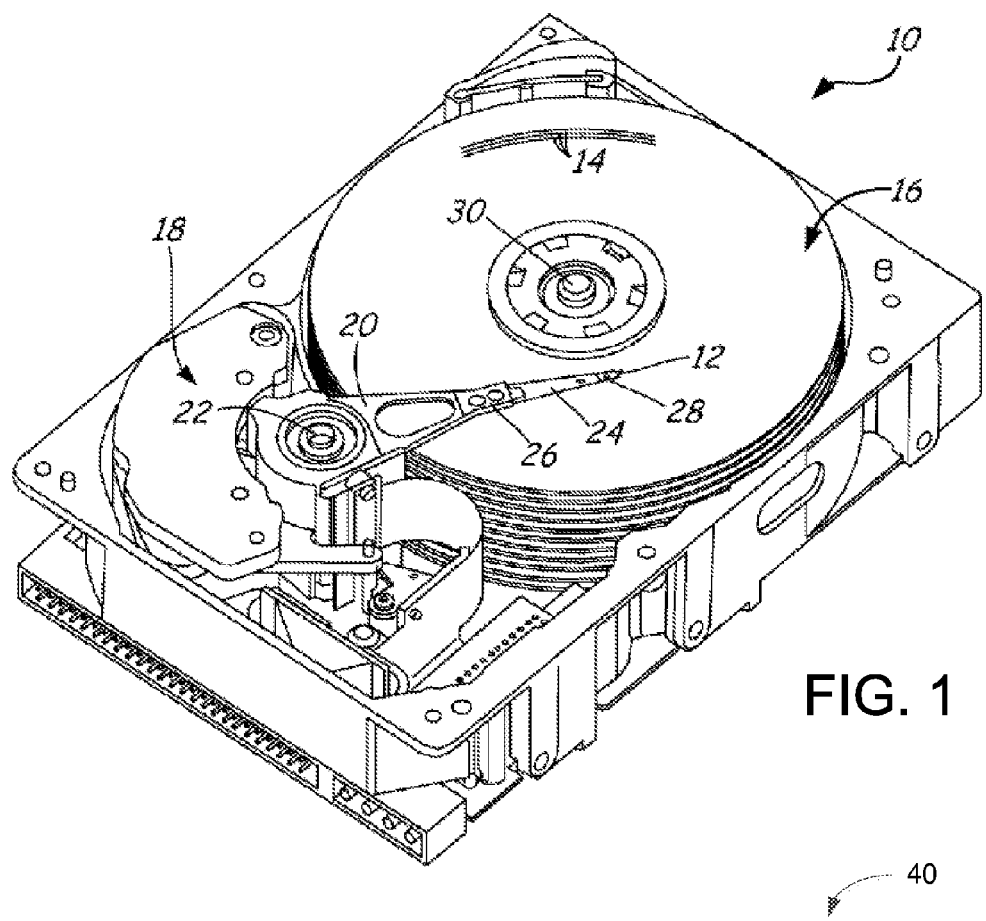
FIG. 1 is a perspective view of a magnetic disc drive.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

In general, the present disclosure provides devices and systems that utilize such devices. In some embodiments, the devices can include a writer portion including a surface at an air bearing surface of the device; a magnetic adhesion layer disposed proximate at least a portion of the surface of the writer portion; and an overcoat disposed proximate at least a portion of the magnetic adhesion layer such that the magnetic adhesion layer is between the at least a portion of the surface of the writer portion and the overcoat. And in some embodiments, one or more of these devices can be a part of a system that also includes magnetic media proximate the air bearing surface of the device.

Since the magnetic field from the magnetic media (which can be detected by the device) and the magnetic field from the writer portion (which changes the magnetic state of the media) of the device decays rapidly, any increase in the distance from magnetic material to magnetic material, which is termed "magnetic spacing", can detrimentally affect writeability and readability of a disc drive system. For example, given a point source positioned in a magnetic field, the decay in the field is roughly inversely proportional to the square of the distance.

By introducing a magnetic adhesion layer at an air bearing surface (ABS) of a device, the write field decay rate with head-to-media spacing can be reduced by increasing the relative magnetic permeability of an overcoat at the ABS interface. In at least some embodiments, this can effectively preserve the magnetic field strength through the magnetic adhesion layer and overcoat, thereby improving bit writing performance in the media and Bit Error Rate (BER).

FIG. 1 is a perspective view of a magnetic disc drive 10 including an actuation system for positioning slider 12 over track 14 of magnetic medium 16. The particular configuration of disc drive 10 is shown for ease of description and is not intended to limit the scope of the present disclosure in any way.

Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28.

Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data.

Slider 12 carries a magnetic device or transducer (not shown in FIG. 1) for reading and/or writing data on tracks 14 of magnetic medium 16. In some embodiments, the magnetic transducer can utilize additional electromagnetic energy to heat the surface of medium 16 to facilitate recording by a process termed heat assisted magnetic recording (HAMR).

In some embodiments, a magnetic device includes a magnetic writer portion for generating a magnetic field to write to a magnetic medium (e.g., magnetic medium 16). A HAMR transducer can include the magnetic writer portion and an optical device to heat a portion of the magnetic medium proximate the write field.

Heat assisted magnetic recording (HAMR) generally refers to the concept of locally heating a recording media to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which can be desirable for recording at increased areal densities. HAMR can be applied to any type of magnetic storage media, including tilted media, longitudinal media, perpendicular media, and patterned media. By heating the media, the coercivity is reduced such that the magnetic write field is sufficient to write to the media. Once the media cools to ambient temperature, the coercivity has a sufficiently high value to assure thermal stability of the recorded information.

Figure 2:
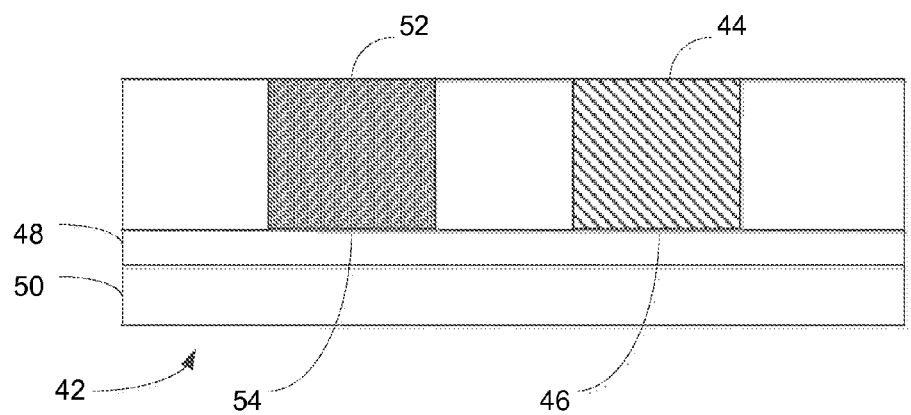
FIG. 2 is a schematic cross-section view of one embodiment of a device that includes a magnetic adhesion layer and an overcoat.

Any suitable magnetic device can be used with the drive 10 of FIG. 1. For example, FIG. 2 is a schematic cross-section view of one embodiment of a device 40. The device 40 has an air bearing surface 42 and includes a writer portion 44 having a surface 46 at the air bearing surface of the device. The writer portion can include any suitable writer for changing the state of magnetic media, e.g., writer portion 68 of FIG. 3. The device 40 also includes a magnetic adhesion layer 48 disposed proximate at least a portion of the surface 46 of the writer portion 44. The device 40 also includes an overcoat 50 disposed proximate at least a portion of the magnetic adhesion layer 48 such that the magnetic adhesion layer is between the at least a portion of the surface 46 of the writer portion 44 and the overcoat.

In some embodiments, the device 40 can optionally include a reader portion 52. The reader portion 52 can include any suitable reader for reading magnetic media, e.g., reader portion 104 of FIG. 3.

The magnetic adhesion layer 48 and the overcoat 50 can include any suitable material or materials. For example, the particular materials that can be included in the magnetic adhesion layer 48 and the overcoat 50 can be chosen by considering a number of properties, e.g., magnetic properties, electrical properties, corrosion properties, physical properties, wear resistant properties, and optical properties. When choosing an appropriate material for a magnetic adhesion layer or an overcoat, one or more than one of these properties (and/or properties not discussed herein) can be considered.

Magnetic properties that may be considered can include, for example, magnetic moment, coercivity, anisotropy, and coupling. In some embodiments, the magnetic moment of a material can be considered when determining whether or not the material could be used as a magnetic adhesion layer or an overcoat material. Generally, materials with magnetic moments that are higher can be better than materials with magnetic moments that are lower. Materials with higher magnetic moments can produce devices that have higher read back amplitude because the magnetic spacing is lower. For example, in some embodiments, selected materials can have magnetic moments of at least 0.1 T and no greater than about 2.4 T.

Coercivity of a material can, but need not, also be considered. In some embodiments, a material whose coercivity is similar to the underlying layer can be utilized. In some embodiments, a material whose coercivity is relatively high may promote write and possible read back gradients. In some embodiments, materials that have a coercivity of at least about 100 Oersted (Oe) can be utilized. In some embodiments, materials that have a coercivity of at least about 200 Oe can be utilized.

The anisotropy of the material can, but need not, also be considered. In some embodiments, the material can have or be formed to have perpendicular anisotropy. In some embodiments, materials with perpendicular anisotropy can reduce the magneto-static energy of the device.

The ability of the material to couple to the magnetic media can, but need not, also be considered. In some embodiments, the material can be capable of ferromagnetically coupling to the magnetic media. Materials that can magnetically couple to the magnetic media can further decrease the magnetic spacing of the device to the magnetic media.

The material that is chosen may also be chosen to be magnetically hard enough, such that the shields that can be included in device 40 do not affect the transducer magnetic alignment.

Electrical properties that may be considered are electrical resistivity (or conversely electrical conductivity). In some embodiments, a material that is considered electrically insulating can be utilized. Materials that are not electrically insulating could cause shunting of current along the ABS in either current in the plane (CIP) or current perpendicular to the plane (CPP) configurations. If shunting occurs, the sense current is reduced, making it harder to read the state of the magnetic device (i.e., read the data in the magnetic media). In some embodiments, materials that have an electrical resistance of at least about $6 \times 10^{-8}$ $\Omega$m can be utilized.

Corrosion properties of materials may also be considered. For example, the corrosion potential of a material may be considered. The corrosion potential (and/or other corrosion related properties) can be important because the overcoat should be able to protect the underlying materials and structures from corrosion that may occur during normal wear and tear of the device. In some embodiments, the corrosion potential at both acidic and neutral conditions can be considered, while in other embodiments, only the corrosion potential at one or the other (acidic or neutral conditions) can be considered. In some embodiments, materials that have corrosion potentials of about 0.0 to −0.1 V in an acidic solution (pH 3.0) can be utilized. In some embodiments, materials that have corrosion potentials of at least about −0.2 V in a neutral solution can be utilized. In some embodiments, materials that have corrosion potentials of about 0.0 to −0.1 V in an acidic solution (pH 3.0) and at least about −0.2 V in a neutral solution can be utilized.

Physical properties of the magnetic adhesion layers and overcoats, or materials making up the magnetic adhesion layer and overcoat that may be considered include, for example, thickness, roughness, density, granular structure, and adhesion for example. In some embodiments, magnetic adhesion layers can have thicknesses of at least about 4 angstroms and no greater than about 12 angstroms. In some embodiments, overcoats can have thicknesses of at least about 10 angstroms. In some embodiments, overcoats can have thicknesses of at least about 20 angstroms. In some embodiments, overcoats can have thicknesses of not greater than about 25 angstroms.

In some embodiments, the roughness of an overcoat can range from about 0 angstroms Ra (1 μm×1 μm scan) to about 2 angstroms Ra. In some embodiments, the roughness can be lower than the roughness of the magnetic media to advantageously contribute to coverage and hydrophobicity of the overcoat. In some embodiments, the density of the overcoat can range from about 1.9 to about 3.1 g/cc. In some embodiments, the granular structure of the overcoat material can be the same as that of the underlying media material.

In some embodiments, the material of the magnetic adhesion layer can be chosen to have good adhesion to the underlying material, e.g., the ABS of the device. And in some embodiments, the material of the magnetic adhesion layer can promote good adhesion to the material over it, e.g., the overcoat.

In some embodiments, the material of the overcoat layer can be chosen to have good adhesion to the underlying material, and in some embodiments promote good adhesion to the material over it (i.e., a lubricating layer in the case of the media overcoat layer). The material for the overcoat can also be chosen to be resistant to wear.

In some embodiments, for example embodiments where the device is a HAMR device, optical properties of one or both of the magnetic adhesion layer and overcoat may be taken into consideration. In some embodiments, materials that have optical properties that are at least as good as diamond like carbon (DLC) can be utilized. Optical properties that can be considered can include, for example, the refractive index (n) and the extinction coefficient (κ). It is generally desirable that the refractive index be relatively large and the extinction coefficient be relatively small. In some embodiments, the refractive index can be at least as high as that of DLC. The refractive index of DLC at 830 nm can range from about 2.095 to about 2.75. In some embodiments, a material having an index of refraction of at least about 2.09 may be utilized. In some embodiments, the extinction coefficient can be no higher than that of DLC. The extinction coefficient of DLC at 830 nm in some embodiments can range from about 0.00 to about 0.21. In some embodiments, a material having an extinction coefficient of less than about 0.08 can be utilized In some embodiments, both the magnetic adhesion layer and the overcoat can exhibit magnetic properties. In other embodiments, the magnetic adhesion layer can exhibit magnetic properties while the overcoat is non-magnetic or exhibits very weak magnetic properties. Any suitable non-magnetic material or materials can be included in non-magnetic embodiments of the overcoat, e.g., diamond-like carbon (DLC), Si, Ti, Ta oxides or nitrides thereof, or combinations thereof.

There are many exemplary magnetic materials that may be utilized in magnetic adhesion layers and embodiments of overcoats that exhibit magnetic properties. It should also be noted that some materials or mixtures of materials can be characterized in more than one fashion, i.e., a single material or mixture could fit into more than one class, as they are described herein. Exemplary materials can include, for example, mixtures of ferromagnetic material and insulating materials; semiconductors doped with magnetic materials; ferrites; two phase materials; atomic level bilayers or multilayers; graded layers of materials; partially oxidized ferromagnetic materials or ferrimagnetic materials; and exotic materials, for example.

One class of materials that can be utilized as magnetic adhesion layers and overcoats includes mixtures of ferromagnetic materials and insulating materials. There are two subclasses of such materials mixtures of ferromagnetic materials and oxides and mixtures of ferromagnetic materials and de-couple grains. Specific types of mixtures of ferromagnetic materials and oxides can include, for example, Nickle Iron (NiFe), cobalt (Co) doped titanium oxide (TiO), and iron cobalt (FeCo) doped yttrium oxide ($Y_2O_3$). Specific types of mixtures of ferromagnetic materials and de-coupled grains can include, for example, cobalt platinum (CoPt) doped carbon (C), silicon dioxide ($SiO_2$), and alumina ($Al_2O_3$).

Another class of materials that can be utilized as magnetic adhesion layers and overcoats includes semiconductors doped with magnetic materials. Specific types of such materials can include, for example, cobalt (Co), nickel (Ni), iron (Fe), or chromium (Cr) doped titanium oxide ($TiO_x$); Co or manganese (Mn) doped zinc oxide (ZnO); Fe or Mn doped tin oxide ($SnO_x$); Fe or Mn doped indium oxide ($In_2O_3$), chromium oxide ($CrO_2$), or europium oxide (EuO); and magnetic nitrides such as chromium aluminum nitride (CrAlN), gallium chromium nitride (GaCrN), gallium vanadium nitride (GaVN), and indium vanadium nitride (InVN). In some embodiments, materials of this class that could that would be used would have relatively high coercivity in order to be magnetically hard.

Another class of materials that can be utilized as magnetic adhesion layers and overcoats includes ferrites. Specific types of such materials can include, for example, barium ferrites ($BaFe_xO_y$) such as $BaFe_{12}O_{19}$, strontium ferrites ($SrFe_xO_y$), and cobalt ferrites ($CoFe_xO_y$). In some embodiments, strontium ferrites ($SrFe_xO_y$) can be utilized in overcoats as disclosed herein.

Another class of materials that can be utilized as overcoats includes two phase materials. Two phase materials can include, for example, ferromagnet/insulator materials or paramagnet/insulator materials. Specific types of such materials can include, for example, cobalt (Co), iron (Fe), nickel (Ni) or their alloys dispersed in an alumina ($Al_2O_3$), silica ($SiO_2$), or carbon (C) matrix.

Another class of materials that can be utilized as magnetic adhesion layers and overcoats includes atomic level bilayers or multilayers. The bilayers or multilayers can include both ferromagnet material/insulator material and paramagnet material/insulator material. Specific types of such materials can include, for example, atomic level bilayers or multilayers of cobalt (Co), iron (Fe), or nickel (Ni) with alumina ($Al_2O_3$), silica ($SiO_2$) or carbon (C).

Another class of materials that can be utilized as overcoats includes graded layers. Specific types of such materials can include, for example, graded layers of cobalt (Co), iron (Fe), or nickel (Ni) with alumina ($Al_2O_3$), silica ($SiO_2$) or carbon (C).

Another class of materials that can be utilized as magnetic adhesion layers and overcoats includes partially oxidized ferromagnetic or ferrimagnetic materials. Specific types of such materials can include, for example, FeCoO, and $Fe_xO_y$. In some embodiments, materials of this class that could that would be used would have relatively high Curie temperature (Tc) to be magnetically hard.

Another class of materials that can be utilized as magnetic adhesion layers and overcoats includes exotic materials. Specific types of such materials can include, for example, manganese (Mn) doped indium antimony (InSb), and cobalt (Co) doped titanium antimony (TiSb). In some embodiments, materials of this class that could that would be used would have relatively high Curie temperature (Tc), for example at least about 400° C.

Also disclosed herein are magnetic adhesion layers and overcoats that can be formed by deposition of a metal layer (via physical vapor deposition, chemical vapor deposition, or atomic layer deposition for example) followed by oxidation in order to produce a ferromagnetic/ferrimagnetic oxide. Types of oxidation that can be utilized herein can include, for example, natural oxidation, radical shower oxidation, ultraviolet (UV) light assisted oxidation, ion beam oxidation, or oxygen plasma oxidation. In some embodiments where an atomic layer deposition process is utilized, a stoichiometric oxide can be formed using a precursor, which can provide a metal cation, and another precursor, which provides an oxygen anion.

Specific materials that can be utilized herein can include, for example, $BaFe_{12}O_{19}$, $CrO_2$, $\gamma$-$Fe_2O_3$, $CoFe_2O_4$, and $Fe_3O_4$. Multilayers or composites including such materials can be utilized. In addition, Fe, Co, or Ni may be added to the multilayers or composites to affect the magnetic properties of the magnetic adhesion layer or overcoat. Ferromagnetic epitaxial growth layers may also be used to obtain a desired oxide phase, while still maintaining magnetic exchange to the underlying head or media layer. A carbon layer may also be modified to make it more magnetically permeable by the addition of Fe, Co, Ni, or a combination thereof for example.

In some embodiments, one or both of the magnetic adhesion layer and the overcoat can include a single layer of ferromagnetic/ferrimagnetic material; however, multilayers of ferromagnetic/ferrimagnetic structures can also be utilized. Such structures can include structures which have three layers (or even more) where two ferromagnetic/ferrimagnetic layers are exchange coupled through a non-magnetic material (ruthenium (Ru) for example). These layers could have anisotropy in the plane of the sample or could have anisotropy out of the plane. Other alternatives for materials can include CoCr, CoNi, and FeCr for example.

In some embodiments, magnetic adhesion layers and/or overcoats (either over the writer portion, the reader portion, or a combination thereof) can be made of any such materials disclosed herein, including, for example $CrO_2$, EuO, and $Fe_3O_4$. In some embodiments, the magnetic adhesion layer 48 can be formed using a material chosen from mixtures of ferromagnetic material and insulating materials; semiconductors doped with magnetic materials; ferrites; two phase materials; atomic level bilayers or multilayers; grade layers of materials; or partially oxidized ferromagnetic materials or ferromagnetic materials; and exotic materials.

In some embodiments, the magnetic adhesion layer 48 can be formed directly on air bearing surface 46. In other embodiments, one or more additional layers can be formed between the magnetic adhesion layer 58 and the air bearing surface 46, e.g., Si, C, Ta, Al, Cr oxides or nitrides thereof, or combinations thereof.

As mentioned herein, the magnetic adhesion layer 48 can be formed or disposed on at least a portion of the air bearing surface 42 of the device 40. In some embodiments, the magnetic adhesion layer 48 can be disposed on substantially all of the air bearing surface 42. In other embodiments, the layer 48 can be formed on substantially all of the surface 46 of the writer portion 44 and not on the surface 54 of the reader portion 52. In other embodiments, the magnetic adhesion layer 48 can be formed on substantially all of the surface 54 of the reader portion 52 and not on the surface 46 of the writer portion 44.

Disposed proximate at least a portion of the magnetic adhesion layer 48 is the overcoat 50. In some embodiments, the overcoat 50 protects the device 40 from wear and corrosion as is further described herein.

In some embodiments, the overcoat 50 can be disposed on substantially all of the magnetic adhesion layer 48. In other embodiments, the overcoat 50 can be disposed on a portion of the magnetic adhesion layer 48. In some embodiments, the overcoat 50 is disposed proximate at least a portion of the magnetic adhesion layer 48 such that the magnetic adhesion layer is between the at least a portion of the surface 46 of the writer portion 44 and the overcoat 50.

The overcoat 50 can be formed or disposed on at least a portion of the magnetic adhesion layer 48 using any suitable technique, e.g., physical vapor deposition, chemical vapor deposition, atomic layer deposition, and suitable evaporative techniques. In some embodiments, the overcoat 50 is formed or disposed directly on the magnetic adhesion layer 48. In other embodiments, one or more additional layers are disposed between the magnetic adhesion layer 48 and the overcoat 50, e.g., Si, C, Ta, Al, Cr oxides or nitrides thereof, or combinations thereof.

Figure 3:
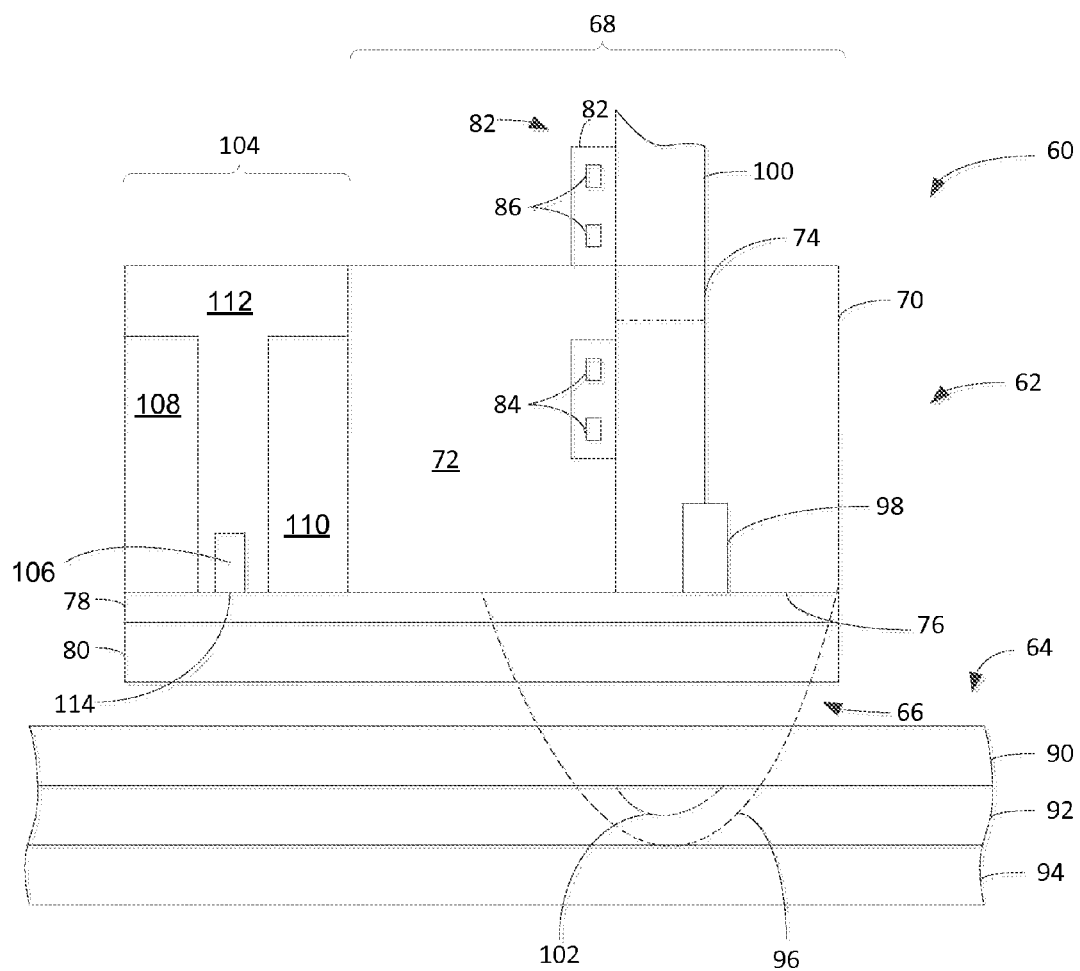
FIG. 3 is a schematic cross-section view of one embodiment of a system that includes a device and magnetic media proximate an air bearing surface of the device.

The writer portion 44 can include any suitable devices such that the writer portion is operable to change the magnetic state of magnetic media (e.g., magnetic media 64 of FIG. 3) positioned proximate the ABS 42 of the device 40, e.g., writer portion 68 of FIG. 3. In some embodiments, the writer portion 44 can include a write pole, return pole, near field transducers, etc.

The device also optionally includes a reader portion 52. The reader portion 52 can include any suitable devices for reading the magnetic state of magnetic media positioned proximate the ABS 42 of the device 40, e.g., reader portion 104 of FIG. 3.

As mentioned herein, the magnetic adhesion layer 48 can be disposed proximate at least a portion of the surface 46 of writer portion 44, substantially all of the surface of the writer portion, or substantially all of the air bearing surface 42 of the device 40. In some embodiments, the magnetic adhesion layer 48 is formed such that it is not positioned proximate the reader portion 52. Any suitable technique or techniques can be utilized to form the magnetic adhesion layer 48 such that it is proximate the surface 46 but not the reader portion 52, e.g., physical vapor deposition, chemical vapor deposition, atomic layer deposition, and suitable evaporative techniques.

Although FIG. 2 depicts the magnetic adhesion layer 48 and the overcoat 50 as being formed proximate both the writer portion 44 and the reader portion 52, in some embodiments, the magnetic adhesion layer and the overcoat are formed proximate the writer portion, while only the overcoat is formed proximate the reader portion. Such embodiments may be utilized as the magnetic properties of the magnetic adhesion layer 48 may interfere with the sensitivity of the reader portion 52 to the magnetic state of magnetic media.

The device 40 can be used for any suitable purpose. For example, the devices described herein can be used in a system to write and read magnetic signals to and from a magnetic media. FIG. 3 is a schematic cross-section view of a system 60 that includes a device 62 and magnetic media 64 proximate an air bearing surface 66 of the device. The specific device 62 shown in FIG. 3 is a HAMR magnetic device, but it should be understood that embodiments disclosed herein can be utilized with HAMR transducers as well as non-HAMR transducers.

The device 62 can include any suitable device, e.g., device 40 of FIG. 2. The device 62 includes a writer portion 68 that can include write pole 70 and return pole 72 coupled by pedestal 74. The writer portion 68 includes a surface 76 at the air bearing surface 66 of the device 62.

The device 62 further includes a magnetic adhesion layer 78 disposed proximate at least a portion of the surface 76 of the writer portion 68, and an overcoat 80 disposed proximate at least a portion of the magnetic adhesion layer such that the magnetic adhesion layer is between the at least a portion of the surface of the writer portion and the overcoat. All of the design considerations and possibilities regarding the writer portion 44, the magnetic adhesion layer 48, and the overcoat 50 of the device 40 of FIG. 2 apply equally to the writer portion 68, the magnetic adhesion layer 78, and the overcoat 80 of the device 62 of FIG. 3.

In some embodiments, the device 62 further includes coil 82, including conductors 84 and 86, that encircles the pedestal 74 and is supported by an insulator 88.

As shown, magnetic storage medium 64 is a perpendicular magnetic medium including media overcoat layer 90, magnetically hard storage layer 92, and soft magnetic underlayer 94 but can include other layers (for example, a lubricant layer can be on the media overcoat layer). It is also understood that the magnetic storage medium 64 can also be other forms of media, such as patterned media.

A current in the coil 82 induces a magnetic field in the pedestal 74 and the poles. Magnetic flux 96 exits the recording head ABS 66 that includes the magnetic adhesion layer 78 and overcoat 80, and is used to change the magnetization of portions of magnetically hard layer 90 of storage medium 64 enclosed within region 96.

In some embodiments, one or both of the magnetic adhesion layer 78 and the overcoat 80 covers substantially all of the surface 76 of the writer portion 68. In other embodiments, one or both of the magnetic adhesion layer 78 and the overcoat 80 can cover less than substantially all of the surface 76 of the writer portion 68.

In the embodiment illustrated in FIG. 3, the device 62 also includes a near field transducer 98 that is positioned adjacent the write pole 70 proximate air bearing surface 66. Near field transducer 98 is coupled to waveguide 100 that receives an electromagnetic wave from an energy source such as a laser. An electromagnetic field at the end of near field transducer 98 can be used to heat a portion 102 of magnetically hard layer 92 to lower the coercivity of the layer so that the magnetic field from the write pole 70 can affect the magnetization of the storage medium 64.

In some embodiments, the device 62 can include a reader portion 104. The reader portion 104 can include any suitable readers, e.g., reader portion 52 of FIG. 2. All of the design considerations and possibilities regarding the reader portion 52 of FIG. 2 apply equally to the reader portion 104 of FIG. 3.

The reader portion 104 can include a read element 106, a top read shield 108, a bottom read shield 110, and a read structure insulation portion 112. As seen in this particular embodiment, the magnetic adhesion layer 78 and the overcoat 80 are configured to cover substantially all of surface 114 of the reader portion 104 as well. Alternatively, in other embodiments, one or both of the magnetic adhesion layer 78 and the overcoat 80 can cover less than substantially all of surface 114 of the reader portion 104, or no portion of surface 114.

As mentioned herein, any suitable technique can be utilized to form the devices and systems described. For example, one exemplary technique includes forming a device having an air bearing surface, where the device includes a writer portion including a surface at the air bearing surface of the device. Any suitable techniques can be utilized to form the device.

A magnetic adhesion layer can be formed on at least a portion of the surface of the writer portion using any suitable techniques. An overcoat is then formed on at least a portion of the magnetic adhesion layer such that the magnetic adhesion layer is between the at least a portion of the surface of the writer portion and the overcoat. Any suitable techniques can be used to form the overcoat. In some embodiments, the overcoat can be formed over substantially all of the air bearing surface of the device.

In some embodiments, a reader portion that includes a surface at the air bearing surface can be formed. In some embodiments, the overcoat can be formed on at least a portion of the surface of the reader portion. In some embodiments, the magnetic adhesion layer can be patterned such that it is not formed on the surface of the reader portion.

Further, in some embodiments, a near field transducer can be formed proximate the writer portion. Any suitable techniques can be utilized to form the near field transducer.

Figure 4:
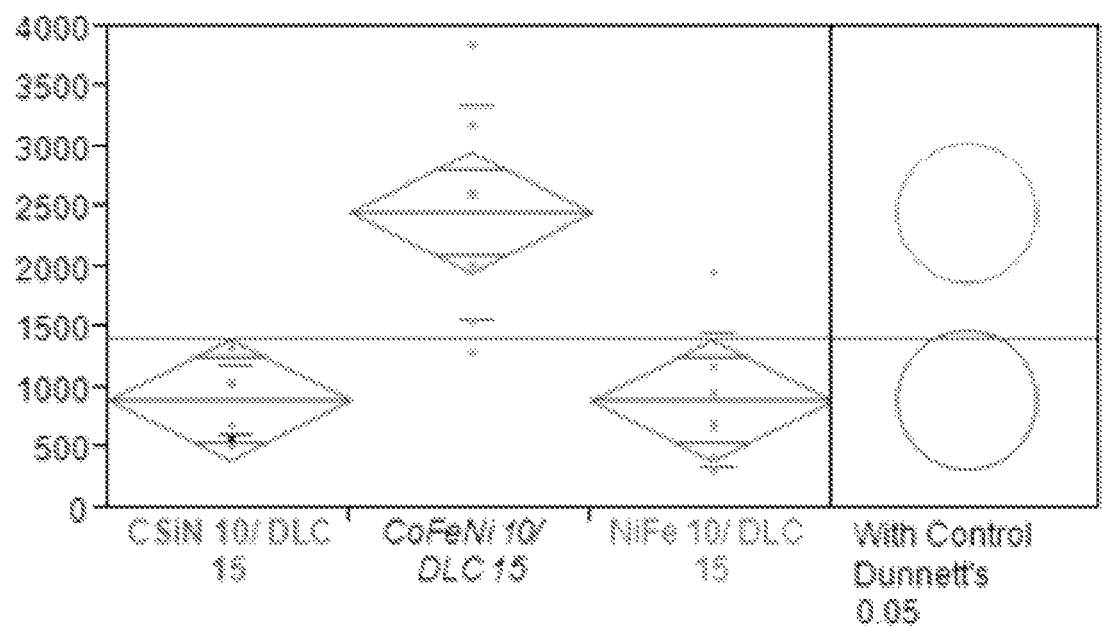
FIG. 4 is a graph of the results from a mechanical wear test for various materials that can be included in a magnetic adhesion layer.

As mentioned herein, any suitable material or materials can be included in the described magnetic adhesion layer that provides the desired properties, e.g., corrosion and wear resistance, etc. FIG. 4 is a graph of results from a mechanical wear test for various materials that can be included in a magnetic adhesion layer. The y-axis includes the failure times in seconds for the various materials. Mechanically robust materials will have greater failure time values. Such mechanically robust materials are, in some embodiments, more desirable as they exhibit greater wear resistance. The magnetic adhesion layers that were tested included 10 angstrom-thick layers of NiFe and CoFeNi each having a DLC overcoat of 15 angstroms in thickness. Comparison analysis using a Dunnet's 0.05 method was used to validate that the failure time values were statistically different from the selected control, which included a layer of CSiN having a thickness of 10 angstroms with a DLC overcoat of 15 angstroms in thickness.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A device having an air bearing surface, the device comprising:
   a writer portion comprising a surface at the air bearing surface of the device;
   a magnetic adhesion layer disposed proximate at least a portion of the surface of the writer portion, wherein the magnetic adhesion layer comprises a material having a magnetic moment of at least about 0.1 T and no greater than about 2.4 T; and
   an overcoat disposed proximate at least a portion of the magnetic adhesion layer such that the magnetic adhesion layer is between the at least a portion of the surface of the writer portion and the overcoat.

2. The device of claim 1, wherein the magnetic adhesion layer is disposed on substantially all of the surface of the writer portion.

3. The device of claim 1 further comprising a reader portion comprising a surface at the air bearing surface, wherein the overcoat is also disposed proximate at least a portion of the surface of the reader portion.

4. The device of claim 1, wherein the magnetic adhesion layer comprises a thickness of at least about 4 angstroms and no greater than about 12 angstroms.

5. The device of claim 1, wherein the overcoat comprises a material that is electrically insulating.

6. The device of claim 1, further comprising a near field transducer.

7. The device of claim 6, wherein the overcoat comprises a material that has a refractive index at 830 nm of at least about 2.09.

8. The device of claim 6, wherein the overcoat comprises a material that has an extinction coefficient at 830 nm of about 0 and no greater than about 0.21.

9. The device claim 1, wherein the magnetic adhesion layer comprises a material chosen from mixtures of ferromagnetic material and insulating materials; semiconductors doped with magnetic materials; ferrites; two phase materials; atomic level bilayers or multilayers; grade layers of materials; or partially oxidized ferromagnetic materials or ferromagnetic materials; and exotic materials.

10. The device of claim 1, wherein the magnetic adhesion layer comprises CoFeNi.

11. The device of claim 1, wherein the overcoat is disposed proximate substantially all of the air bearing surface of the device.

12. A system, comprising:
    the device of claim 1; and
    magnetic media proximate the air bearing surface of the device.

13. A method, comprising:
    forming a device having an air bearing surface, wherein the device comprises a writer portion comprising a surface at the air bearing surface of the device;
    forming a magnetic adhesion layer on at least a portion of the surface of the writer portion, wherein the magnetic adhesion layer comprises a material having a magnetic moment of at least about 0.1 T and no greater than about 2.4 T; and
    forming an overcoat on at least a portion of the magnetic adhesion layer such that the magnetic adhesion layer is between the at least a portion of the surface of the writer portion and the overcoat.

14. The method of claim 13, wherein forming the magnetic adhesion layer comprises forming the magnetic adhesion layer on substantially all of the surface of the writer portion.

15. The method of claim 13, further comprising forming a reader portion comprising a surface at the air bearing surface, wherein forming the overcoat further comprises forming the overcoat on at least a portion of the surface of the reader portion.

16. The method of claim 13, wherein the magnetic adhesion layer comprises a thickness of at least about 4 angstroms and no greater than about 12 angstroms.

17. The method of claim 13, wherein forming the device further comprises forming a near field transducer proximate the writer portion.

18. The method of claim 13, wherein forming the overcoat further comprises forming the overcoat on substantially all of the air bearing surface of the device.

* * * * *